United States Patent [19]

Bush et al.

[11] Patent Number: 4,717,483
[45] Date of Patent: Jan. 5, 1988

[54] PURIFICATION OF WASTE STREAM FROM TANNING PROCESS BY ADSORPTION ON AN ADSORBENT COMPRISING A MIXTURE OF ALUMINA AND Y ZEOLITE

[75] Inventors: John F. Bush, Plum Borough; Hubert L. Fleming, Lower Burrell, both of Pa.

[73] Assignee: Aluminum Company of America, Pittsburgh, Pa.

[21] Appl. No.: 877,554

[22] Filed: Jun. 23, 1986

[51] Int. Cl.$^4$ ............................................... C02F 1/28
[52] U.S. Cl. ...................................................... 210/681
[58] Field of Search ..................... 210/681, 691, 502.1, 210/503

[56] References Cited

U.S. PATENT DOCUMENTS

| | | | |
|---|---|---|---|
| 3,420,709 | 1/1969 | Barrett et al. | 210/502.1 |
| 3,625,886 | 12/1971 | Mattia | 210/673 |
| 3,723,308 | 3/1973 | Breck | 210/681 |
| 4,225,639 | 9/1980 | Matyasi et al. | 427/372.2 |
| 4,290,895 | 9/1981 | Iwamoto | 210/669 |
| 4,414,111 | 11/1983 | Iwaisako et al. | 210/500.2 |

OTHER PUBLICATIONS

Von Heinz Bernhardt et al., "Anwendung der Aktivtonerdefiltration zur Eliminierung von Phosphaten aus Kleinen Talsperrenzulaufen", Zeitschrift fur Wasser und Abwasser Forshung, vol. 14, 1981, pp. 180–187.
Russell L. Culp et al., Handbook of Advanced Wastewater Treatment, 2nd ed., New York: Van Nostrand Reinhold Co., 1978, pp. 323–348.
R. J. Starkey, Jr., et al., "An Investigation of Ion Removal from Water and Wastewater", EPA-660/3-74-022 (PB-240 158), National Environmental Protection Agency, Aug. 1973, pp. 28 and 37 (Table 8).

Primary Examiner—Ivars Cintins
Attorney, Agent, or Firm—Andrew Alexander; John P. Taylor

[57] ABSTRACT

An improved process is disclosed for the simultaneous removal of ammonia, sulfides and organic impurities from an impure aqueous stream from a tanning process which comprises contacting the impure stream with an adsorbent comprising a mixture of alumina and a Y zeolite.

10 Claims, 2 Drawing Figures

PURIFICATION OF WASTE STREAM FROM TANNING PROCESS BY ADSORPTION ON AN ADSORBENT COMPRISING A MIXTURE OF ALUMINA AND Y ZEOLITE

BACKGROUND OF THE INVENTION

1. Field of the Invention

This invention relates to an improved process for purifying a waste stream. More particularly, this invention relates to the purification of an aqueous waste stream from a tanning process containing ammonia, sulfides, and dissolved organic materials by adsorption on an adsorbent comprising a mixture of alumina and Y zeolite.

2. Description of the Related Art

Waste streams from tanning processes usually contain ammonia, sulfides, and dissolved organics due to the use of chemicals such as $NH_4Cl$ or $(NH_4)_2SO_4$ which are used in the tanning of hides and the organic residues from the hides.

Current commercially practiced methods for purifying waste streams from such processes employ precipitation techniques which are expensive and technically unsatisfactory. It is also known to individually remove some of the impurities found in such streams by use of adsorbents such as silica gel, activated alumina or zeolites.

For example, Iwamoto U.S. Pat. No. 4,290,895 describes the removal of ammonia from sewage using silica gel as an adsorbent, while Iwaisako et al U.S. Pat. No. 4,414,111 describes the adsorption of ammonia from an aqueous solution using a composite adsorbent having a skin-core structure comprising a mixture of a powdery ion-exchange type adsorbent such as a natural or synthetic zeolite and an acrylonitrile polymer.

The use of an activated alumina adsorbent to separate various neutral organic substances for layer chromatographical purposes is described in Matayasi et al U.S. Pat. No. 4,225,639. Bernhardt et al in an article entitled "Anwendung der Aktivtonerdefiltration zur Eliminierung von Phosphaten aus kleinen Talsperrenzulaufen" published in Zeitschrift fur Wasser und Abwasser Forshung, Volume 14, 1981, at pages 180–187, describes the results obtained from the treatment of effluents from fish farming ponds with activated alumina. The authors claim an 80% reduction in phosphates but state that reductions in ammonium levels and total organic carbons were much more variable.

The use of alumina to remove ammonium nitrogen and organics from waste water is also discussed by Starkey, Jr. et al in report EPA-660/3-74-022 (August 1973) entitled "An Investigation Of Ion Removal From Water And Wastewater", prepared for the U.S. Environmental Protection Agency. The authors describe the alumina adsorption column on page 28 of the report and show carbon and ammonia nitrogen removal results in Table 8.

Culp et al in the "Handbook of Advanced Wastewater Treatment", 2nd Edition, published by Van Nostrand Reinhold Company, N.Y. in 1978, describe nitrogen removal in chapter 7. From pages 323 to 348, the authors describe the use of selective ion exchange to remove ammonium nitrogen using clinoptilolite, a naturally occurring zeolite.

However, it has been found that the use of either conventional activated alumina or a zeolite alone will not provide the desired amount of simultaneous removal of ammonia, sulfides, and organic materials from wastewaters from a tanning process.

SUMMARY OF THE INVENTION

It is, therefore, an object of this invention to provide an improved process for the removal of ammonia, sulfides, and organic impurities from an aqueous stream.

It is another object of this invention to provide an improved process for the removal of ammonia, sulfides, and organic impurities from an aqueous stream using a mixture of alumina and a Y zeolite such as low crystallinity sodium Y zeolite high in $NaSO_4$.

These and other objects of the invention with be apparent from the following description and accompanying drawings.

In accordance with the invention, an improved process for the simultaneous removal of ammonia, sulfides and organic impurities from an impure aqueous stream comprises contacting the impure stream with an adsorbent comprising a mixture of alumina and a Y zeolite. The process is reversible and allows for recovery of the ammonia as a valuable, reusalbe salt such as ammonium chloride and/or ammonium sulfate.

DETAILED DESCRIPTION OF THE INVENTION

Figure 1:
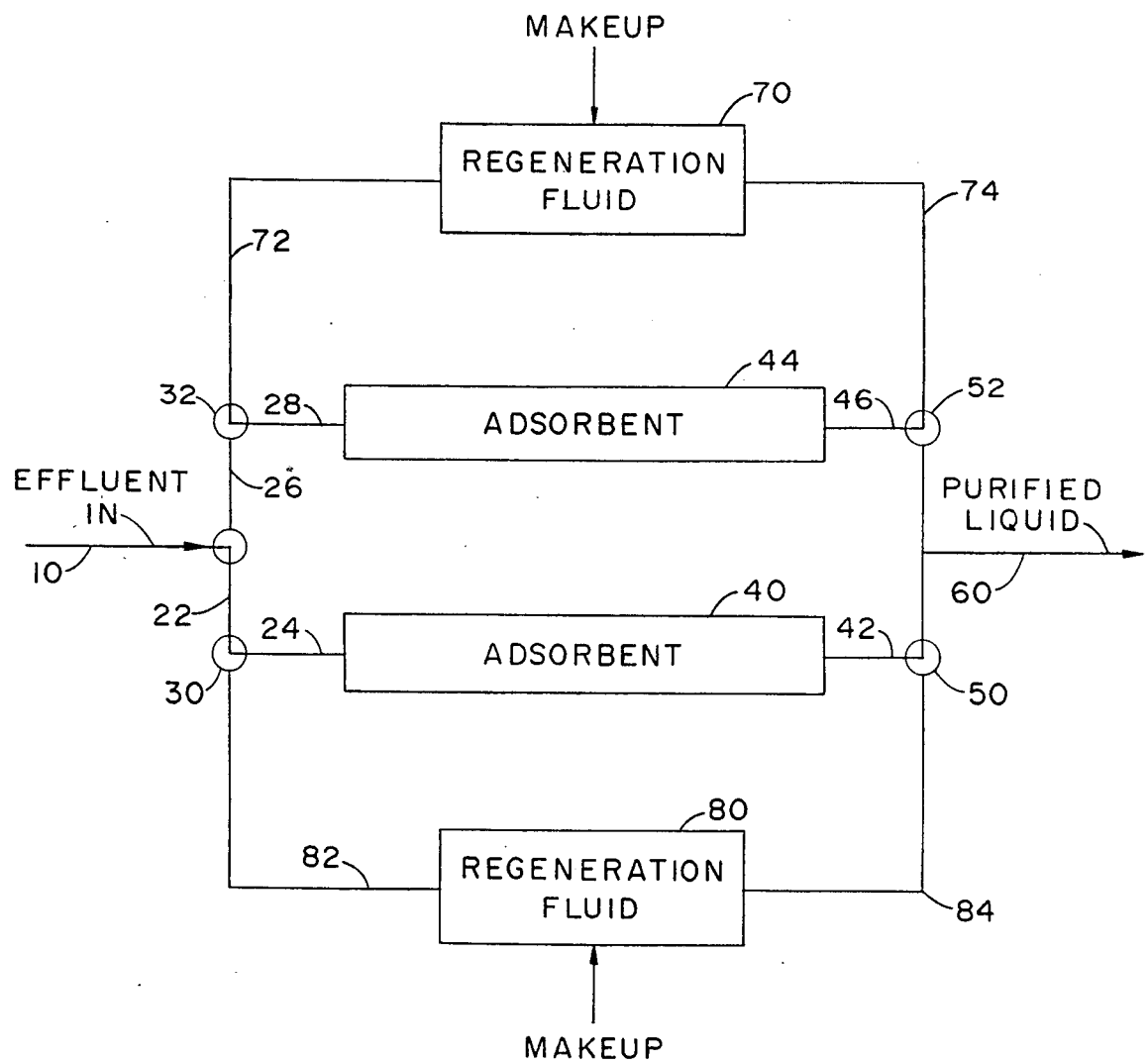
FIG. 1 is a pictorial diagram of the process of the invention.
Figure 2:
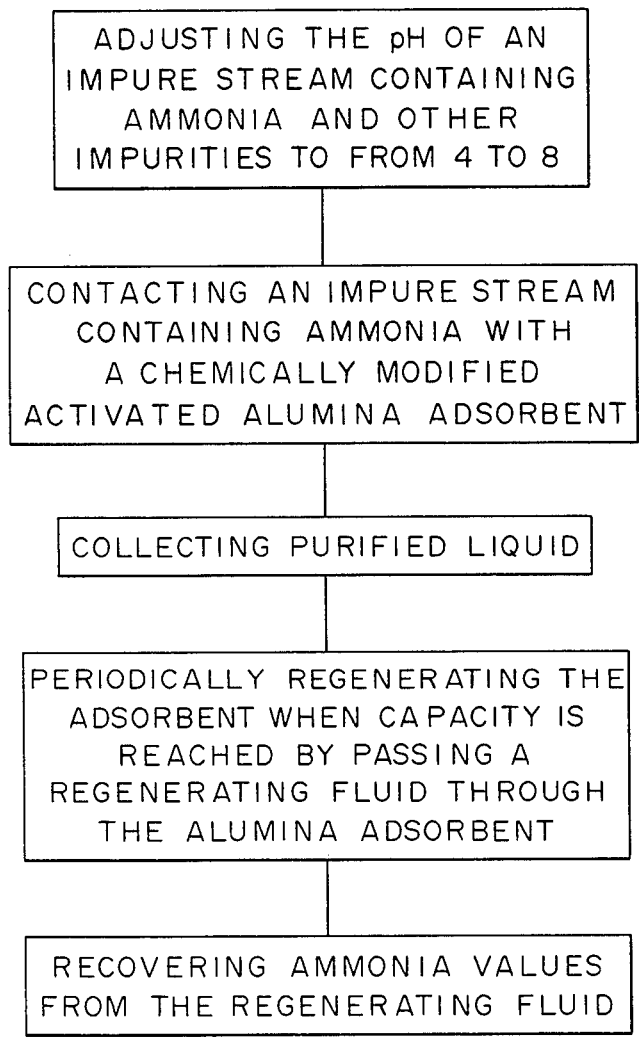
FIG. 2 is a flowsheet describing the process of the invention.

The tanning solution effluent to be purified contains from about 15 to 4500 ppm of ammonium present as ammonium hydroxide. The tanning solution also contains from about 10 to 100 ppm of sulfates and from about 100 to 5000 ppm of total dissolved solids including organic acids, ketones, amines, phosphates and inorganic salts.

In accordance with the process of this invention, the tanning solution effluent is purified by first adjusting its pH to from about 4.0 to 8.0 by the addition of a dilute acid and then passing it through a bed containing a special adsorbent material which comprises a mixture of adsorbents to optimize the adsorption capacity of the mixture for ammonia containing ammonium ions, hydrogen sulfide and total organic carbon (TOC).

The adsorbent mixture useful in the process of the invention comprises a combination of from about 50–95 wt. % alumina and 5–50 wt. % Y zeolite, preferably about 70 to 80 wt. % alumina and from about 20 to 30 wt. % Y zeolite such as described and claimed in Goodboy et al U.S. patent application Ser. No. 795,907, assigned to the assignee of this invention and cross-reference to which is hereby made. A preferred form of the Y zeolite contains about 2 to 7 wt. %, preferably 2 to 5 wt.% sodium silicate ($NaSi_2O_4$). Activation of the zeolite may be achieved by subjecting it to a temperature in the range of 450° to 550° C., typically 525° C. to form sodium aluminum silicate which has an improved level of adsorbtivity.

As described more fully in the aforementioned patent application, the adsorbent mixture useful in the process of this invention includes an alumina preferably having an average particle size of about 5 to 10 microns which has been rapidly activated by exposure to a temperature of greater than about 300° C. for less than a minute to form an activated alumina having an LOI (hydroxyl content determined by drying at 400° C. and then heating at 1100° C.) of about 4-10 wt. %. The alumina useful in the process of the invention is further characterized by a low $Na_2O$ content of 0.4 wt. % or less as well as having a low crystalline structure, i.e., a structure which only gives weak x-ray diffraction patterns, which is a predominantly gamma structure.

The Y zeolite component of the adsorbent mixture comprises a synthetic, crystalline zeolitic sodium aluminosilicate such as disclosed in Breck U.S. Pat. No. 3,130,007. The Y zeolite preferably comprises particles of less than about 5 microns of a sodium Y zeolite with a $Na_2O$ content of at least about 12.7 wt. % with a molar ratio of $SiO_2$ to $Al_2O_3$ of about 4.5 to 6.0 and having a sufficiently low sodium silicate content that a 20 wt. % aqueous slurry of the particles will have a pH of less than about 10.42. This pH is measured on the pore zeolite with the addition of the $NaSi_2O_4$, the pH should be greater than 10.8, preferably 11.0 to 11.2.

The particles may be formed by a variety of processes such as ball forming in a pan-type agglomerator, agglomeration in a fluidized bed, extrusion, tabletting, or other similar techniques. For example, the activated alumina and Y zeolite components of the adsorbent may be agglomerated in a typical ball forming process to form a composite agglomerate having a water content of about 30-40 wt. %. The agglomerates are aged for about 2 to 4 hours at about 30° C. in the presence of water having a pH preferably greater than 7.

After agglomeration, the aged mixture is then reactivated at a temperature of about 420° to 550° C. to a LOI of less than about 6.0 wt. % with surfaces of from greater than 200 $m^2/g$ up to as high as 450 $m^2/g$.

The resultant activated adsorbent agglomerate is then ground to a particle size which may vary from as high as ⅛ inch to as small as +100 mesh (Tyler). The density of the particles should range from about 32 to 50 $lb/ft^3$ and the porosity should be at least 0.5 cc/gm to permit sufficient flow into the pores to achieve the desired adsorption kinetics.

The resultant adsorbent is further characterized by a 4-8 wt. % loss on ignition (250°-1200° C.), a crush strength above 10 lbs., a loose bulk density of about 31 $lb/ft^3$, and a packed bulk density of about 49 $lb/ft^3$. The total pore volume is at least 0.5 cc/g and preferably higher up to about 0.8 cc/g. Most of the pore volume, i.e., at least 40%, needs to be in the 60-150 angstrom range to minimize pore diffusion resistances.

The adsorbent mixture may be used in packed beds in granular form (preferably 28 to 48 mesh Tyler Series) in order to keep the pressure drop across the bed fairly low. Although the process of the invention will be so illustrated, it must be noted that, alternatively, the adsorbent may be used in a fluidized bed or in any other form which will permit contact between the adsorbent and the aqueous solution to be purified.

The tanning solution effluent is passed through the bed at a rate sufficient, with respect to the bed volume, to pass from 1 to 10 bed volumes of effluent through the bed per hour, preferably 2 to 6, typically 3 to 4 bed vol/hr. Thus, the flow rate, i.e., the rate of flow in liters/hour, will depend upon the volume of the bed to thereby provide a sufficient minimum residence or contact time between the effluent and the adsorbent.

The temperature at which the process is operated may conveniently be room temperature up to about 40° C. Temperatures higher than this may be satisfactory in some instances. The adsorbent bed may be regenerated in accordance with the process described and claimed in Bush et al Ser. No. 877,638, entitled "Improved Method for Regenerating Adsorbent Mixture of Alumina and Zeolite for Adsorption of Ammonia," assigned to the assignee of this application and filed on June 23, 1986.

After the ammonia has been stripped from the bed, ammonia values may be recovered for recycling back to the tanning process if desired by air stripping or by treating the regeneration fluid with an acid such as HCl or $H_2SO_4$ to cause precipitation of the corresponding ammonium salt, e.g., $NH_4Cl$ or $(NH_4)_2SO_4$.

Turning now to FIG. 1, the process of the invention will be shown by way of illustration and not of limitation. In FIG. 1, the aqueous tanning solution effluent to be purified is carried to the purification zone in a conduit 10 and passes through a three way valve 20 which alternatively directs the flow through either conduit 24 or 26 depending upon which of the adsorbent beds is on stream at the time as will be described.

When bed 40 is on stream, valve 20 directs the flow through conduit 22 to a second three way valve 30 which is set to direct the flow through conduit 24 to adsorbent bed 40. The purified effluent liquid emerges from bed 40 through conduit 42 from which it flows through three way valve 50 to exit conduit 60 from which it may be discharged as a purified liquid.

When the adsorbent capacity of the adsorbent in bed 40 has been reached, valve 20 may be turned to redirect the flow to bed 44 through conduit 26, three way valve 32 and conduit 28. The adsorbent in bed 40 may then either be discarded or, preferably, will be regenerated.

To regenerate adsorbent bed 40, three way valves 30 and 50 may be reset to permit regeneration fluid from reservoir 80 to flow through conduit 82, valve 30 and conduit 24 into adsorbent bed 40 and then out conduit 42 through valve 50 into conduit 84 back to reservoir 80.

Adsorbent bed 44 may be regenerated in like manner using valves 32 and 52 to direct the flow of regeneration fluid from reservoir 70 through conduits 72 and 28 into adsorbent bed 44 and then back to reservoir 70 via conduits 46 and 74. It should be noted that two regeneration fluid reservoirs are illustrated for convenience in illustrating the piping only. In actual practice both adsorbent beds may be regenerated using the same source of regeneration fluid since the intention is that one bed will be on line adsorbing effluent while the other bed is off line being regenerated.

It will also be appreciated that the flow of the effluent or regeneration fluids through the conduits and valves may be by gravity, as illustrated, or the fluids may be fed to the beds via pumps (not shown) as will be readily apparent to those skilled in the art.

Thus the invention provides for an improved process for the purification of effluents containing ammonia and organic impurities from tanning processes by contacting the impure effluent with an adsorbent comprising a mixture of alumina and Y zeolite which is particularly effective in removing ammonia and organic impurities found in the effluent from a tanning process.

Having thus described the invention, what is claimed is:

1. An improved process for the adsorption of ammonia and organic impurities from an effluent which comprises contacting the effluent with an adsorbent comprising a mixture of an activated alumina and a Y zeolite.

2. The process of claim 1 wherein said contacting step further comprises passing said effluent through a bed of said adsorbent mixture.

3. The process of claim 2 wherein said step of passing said effluent through said bed of adsorbent further comprises passing said effluent through said bed at a flow rate, with respect to said bed volume, of from about 1 to 10 bed volumes per hour.

4. The process of claim 3 including the further step of adjusting the pH of said effluent to a range of from about 4 to 8 prior to passing said effluent through said adsorbent bed.

5. The process of claim 3 wherein the flow rate is in the range of 2 to 6 bed volumes per hour.

6. The process of claim 1 wherein the zeolite contains 2 to 7 wt. % sodium silicate prior to activation.

7. The process of claim 6 wherein the zeolite is activated at a temperature in the range of 450° to 550° C.

8. The process of claim 1 wherein the adsorbent has a surface area greater than 200 m²/g.

9. The process of claim 1 wherein the adsorbent has a pore volume in the range of 0.5 to 0.8 cc/gm.

10. An improved process for the adsorption and removal of ammonia and organic impurities from an aqueous liquid which comprises contacting the impure aqueous stream with an adsorbent comprising a mixture of:
 (a) from 50 to 95 wt. % of an activated alumina having an average particle size of about 5 to 10 microns which has been activated by rapidly heating the alumina to a temperature of greater than 300° C. for less than a minute; and
 (b) from 5 to 50 wt. % of a Y zeolite containing from about 2 to 7 wt. % sodium silicate, a $Na_2O$ content of at least about 12.7 wt. %, and a silica to alumina ratio of about 4.5 to 6.0 with an average particle size of less than about 0.5 microns which has been activated by heating to a temperature of from 450° to 550° C.

* * * * *